United States Patent
Park

(10) Patent No.: US 9,965,152 B2
(45) Date of Patent: May 8, 2018

(54) MOBILE TERMINAL AND CONTROLLING METHOD THEREOF

(71) Applicant: LG ELECTRONICS INC., Seoul (KR)

(72) Inventor: Dongcheon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 708 days.

(21) Appl. No.: 14/048,819

(22) Filed: Oct. 8, 2013

(65) Prior Publication Data

US 2014/0123018 A1    May 1, 2014

(30) Foreign Application Priority Data

Nov. 1, 2012    (KR) .................. 10-2012-0123133

(51) Int. Cl.
*G06F 3/0484* (2013.01)
*H04M 1/725* (2006.01)

(52) U.S. Cl.
CPC ...... *G06F 3/0484* (2013.01); *H04M 1/72522* (2013.01); *H04M 1/72561* (2013.01); *H04M 1/72583* (2013.01)

(58) Field of Classification Search
None
See application file for complete search history.

(56) References Cited

U.S. PATENT DOCUMENTS

| 6,781,575 B1 | 8/2004 | Hawkins et al. |
| 8,035,657 B2* | 10/2011 | Vau ................ H04N 1/3871 345/629 |
| 2005/0176460 A1* | 8/2005 | Hamanaga ...... H04M 1/274575 455/550.1 |
| 2006/0274086 A1* | 12/2006 | Forstall .................. G06F 9/543 345/629 |
| 2007/0025589 A1* | 2/2007 | Okamoto .............. G06F 21/608 382/100 |
| 2007/0106952 A1* | 5/2007 | Matas ............... G06F 17/30905 715/764 |

(Continued)

FOREIGN PATENT DOCUMENTS

| CN | 101482796 | 7/2009 |
| CN | 101853122 | 10/2010 |

(Continued)

OTHER PUBLICATIONS

European Patent Office Application Serial No. 13188230.0, Search Report dated Feb. 28, 2014, 7 pages.

*Primary Examiner* — Tuan S Nguyen
(74) *Attorney, Agent, or Firm* — Lee, Hong, Degerman, Kang & Waimey

(57) ABSTRACT

Disclosed as a mobile terminal and controlling method thereof, by which a capture image used to play a role in delivering information only is utilized as a medium for activating a target application program. The present invention disclose a mobile terminal comprising a memory configured to save data, a display unit configured to display an active screen of an application program, and a controller configured to, if a capture command is inputted, extract an activation information related to the active screen which is set as a capture target, and control a capture image having the extracted activation information saved as metadata to be created.

14 Claims, 28 Drawing Sheets

(56) References Cited

U.S. PATENT DOCUMENTS

| | | | |
|---|---|---|---|
| 2009/0132907 A1 | 5/2009 | Shao et al. | |
| 2009/0300530 A1 | 12/2009 | Falchuk | |
| 2010/0215160 A1* | 8/2010 | Chen | G06Q 10/109 379/93.02 |
| 2011/0310039 A1* | 12/2011 | Kim | G06F 3/0481 345/173 |
| 2012/0184260 A1* | 7/2012 | Bocking | H04M 1/72547 455/418 |
| 2013/0125069 A1* | 5/2013 | Bourdev | G06F 3/04845 715/863 |

FOREIGN PATENT DOCUMENTS

| | | |
|---|---|---|
| CN | 102253955 | 11/2011 |
| CN | 102333146 | 1/2012 |
| CN | 102404447 | 4/2012 |
| CN | 102486716 | 6/2012 |
| EP | 2207081 | 7/2010 |
| EP | 2464084 | 6/2012 |
| JP | 2006-252409 | 9/2006 |
| KR | 10-2008-0006129 | 1/2008 |

* cited by examiner

Active screen of alarm application

Active screen of dial application

Capture image

Screen outputted by processing activation information

Capture image

Installation screen of application program
indicated by activation information

Extract activation information com.android.messenger.activity1

MOBILE TERMINAL AND CONTROLLING METHOD THEREOF

Pursuant to 35 U.S.C. § 119(a), this application claims the benefit of earlier filing date and right of priority to Korean Application No. 10-2012-0123133, filed on Nov. 1, 2012, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for activating a target application program through a capture image.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a capture function of facilitating a user to capture an image from any operating screen is emphasized for a mobile terminal. And, a recently emphasized handwritten input function can be regarded as a part of the capture function in consideration of inputting a handwriting by taking a currently displayed active screen as a background image.

However, a capture image created by a handwritten input command or a capture command of a related art just performs a function of simply outputting an image data only but is unable to perform more functions at all. When a user intends to output the same screen configuration of a capture image by looking at the capture image, it is inconvenient for the user to activate an application program at that time of capturing the capture image and manipulate the application program manually in order to display an active screen at that time of capturing the capture image.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which a desired application program can be activated with ease through a capture image.

Another object of the present invention is to provide a mobile terminal and controlling method thereof, by which an active screen having the configuration equivalent to that of an active screen of an application screen at that time of capturing a capture image can be displayed through the capture image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention includes a memory configured to save data, a display unit configured to display an active screen of an application program, and a controller configured to, if a capture command is inputted, extract an activation information related to the active screen which is set as a capture target; and control a capture image having the extracted activation information saved as metadata to be created.

In another aspect of the present invention, a mobile terminal according to another embodiment of the present invention includes a memory configured to save a capture image having an activation information saved as metadata, a display unit configured to display the capture image, and a controller configured to, if a prescribed user input is applied while the capture image is displayed, extract the activation information from the metadata, and process the extracted activation information.

In another aspect of the present invention, a method of controlling a mobile terminal according to another embodiment of the present invention includes the steps of receiving an input of a capture command while an activation screen of an application program is displayed, extracting an activation information related to an active screen which is set as a capture target, and creating a capture image having the extracted activation information saved as metadata.

In another aspect of the present invention, a method of controlling a mobile terminal according to a further embodiment of the present invention includes the steps of displaying a capture image having an activation information saved as metadata, receiving a user input, extracting the activation information from the capture image in response to the user input, and processing the extracted activation information.

Effects obtainable from the present invention are non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
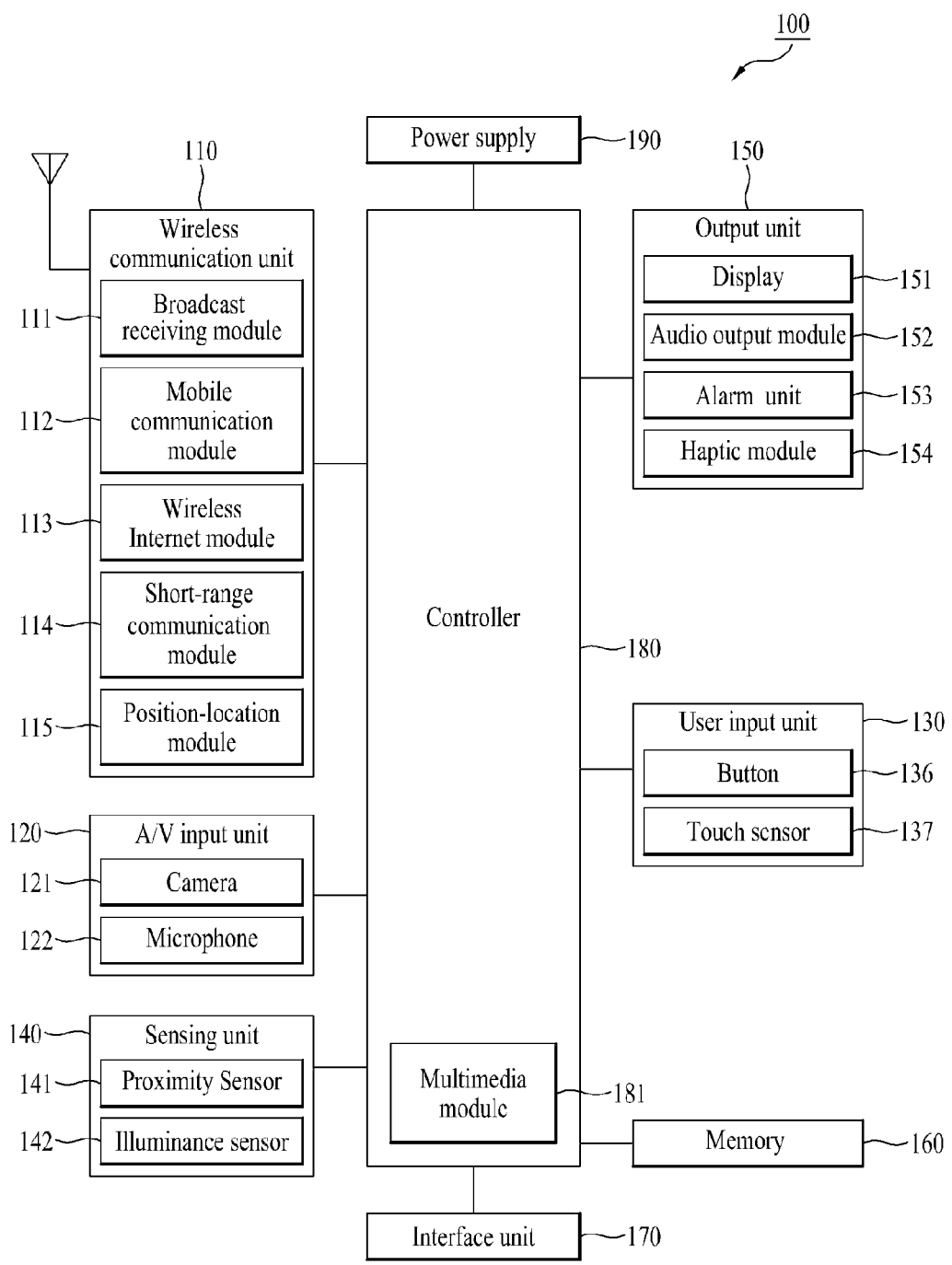
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
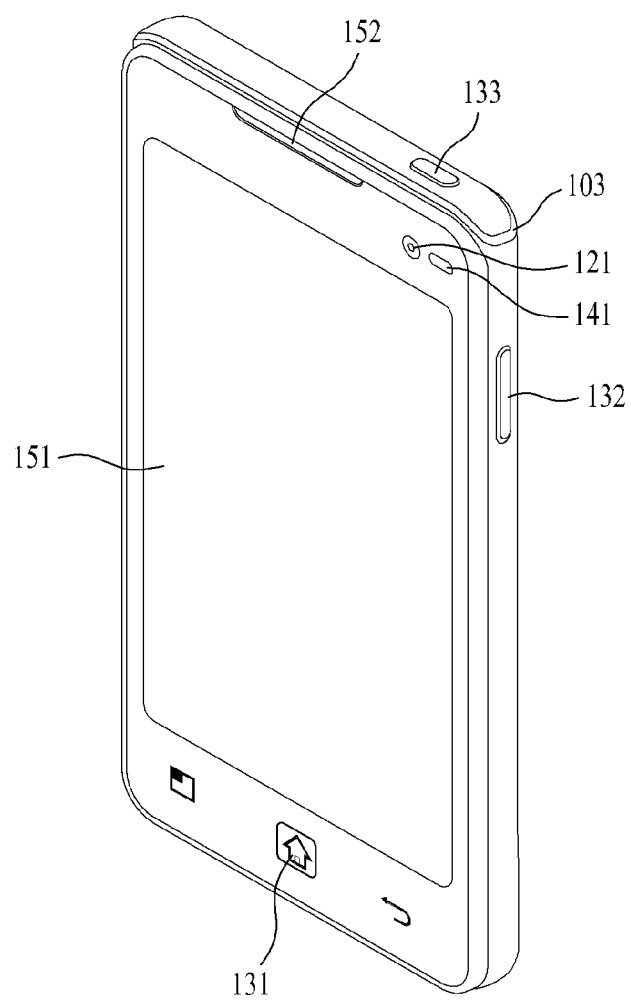
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
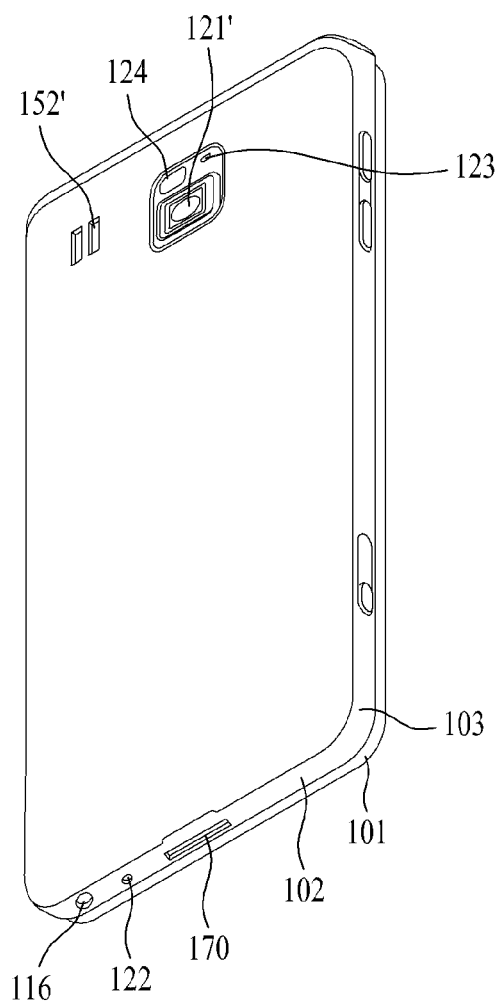
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

In the following description, an application program running through the mobile terminal 100 and activity identification information of the application program are explained in detail. An application program mentioned in the description of the present invention is a general name of a program written for the purpose of handling a specific job unlike such basic software as an operating system, a utility program, a language processing program and the like. And, the application program can be used as having the meaning equivalent to that of a package program or an application.

An application program running in Android Operating System can be identified with a name or a package name. A name of an application program is such a term of an application program exposed to a user as an alarm, a calendar, a map, an email and the like. And, a package name is an application program class name determined on programming an application program. For instance, in Android Operating System, a dial application for performing a phone call can be exposed to a user as a name 'dial' and a package name of the dial application can be identified as com.android.phone. For another instance, a market application enabling a download of an application program can be exposed to a user as a name 'market' and a package name of the market application can be identified as com.android.vending.

An application program running in Android Operating System can include at least one activity. The activity indicates a single screen of the application program. For instance, if an active screen of an application program outputted through the display unit 151 is switched to a $2^{nd}$ active screen from a $1^{st}$ active screen, an activity can be regarded as switched to a $2^{nd}$ activity from a $1^{st}$ activity.

A status of activity can be set to one of an active status, a pause status and a stop status. If an activity is in active status, an active screen matching an activity of the active status is outputted through the display unit 151 and a user-interactive status is entered. For instance, in a status in which a $1^{st}$ activity is active, a $1^{st}$ active screen matching the $1^{st}$ activity may be regarded as outputted through the display unit 151.

The pause status may mean a status in which an interaction with a user is disabled despite that an active screen matching an activity is currently displayed. For instance, in case of attempting to change a $1^{st}$ activity into a $2^{nd}$ activity, the controller 180 can control the $1^{st}$ activity to enter a pause status in order to switch an output of the display unit 151 to a $2^{nd}$ active screen matching the $2^{nd}$ activity from a $1^{st}$ active screen matching the $1^{st}$ activity. If the $1^{st}$ activity is in the pause status, the display unit 151 may be in status, in which interaction with a user is not available (i.e., a user input applied to the $1^{st}$ active screen by a user is not recognizable), despite that the $1^{st}$ active screen is displayed on the display unit 151.

The stop status may mean a status in which an active screen matching an activity is not outputted through the display unit 151 anymore by being replaced by another active screen matching a different activity or a home screen. For instance, as a command for changing a $1^{st}$ activity into a $2^{nd}$ activity, if an output of the display unit 151 is switched from a $1^{st}$ active screen matching the $1^{st}$ activity to a $2^{nd}$ active screen matching the $2^{nd}$ activity, the $1^{st}$ active screen may be regarded as entering a stop status. In doing so, the $2^{nd}$ activity for the $2^{nd}$ active screen may be regarded as entering an active status.

A plurality of activities included in an application program can be identified by random names assigned thereto by a programmer on programming the application program, respectively.

In the following description, a mobile terminal 100 according to the present invention is explained in detail. For clarity and convenience of the following description, assume that a mobile terminal 100 mentioned in the following description includes at least one of the components shown in FIG. 1. In particular, a mobile terminal 100 according to the present invention is assumed as including the wireless communication unit 110, the display unit 151, the memory 160 and the controller 180 among the components shown in FIG. 1 at least. In the mobile terminal 100 according to the present invention, if the display unit (or module) 151 includes a touchscreen, implementation of the following embodiments may be further facilitated. Therefore, the following description is made on the assumption that the display module 151 includes a touchscreen 151.

For clarity, regarding a mobile terminal 100 according to the present invention, the mobile terminal 100 in a step of creating a capture image and an operation of the mobile terminal 100 in a capture image saved state are separately described as follows.

<Mobile Terminal of Creating Capture Image>

Figure 4:
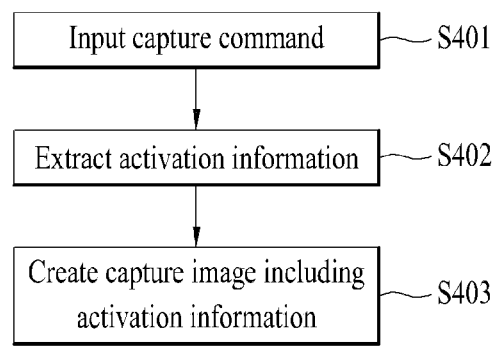
FIG. 4 is a flowchart for an operation of a mobile terminal according to one embodiment of the present invention.

FIG. 4 is a flowchart for an operation of a mobile terminal according to one embodiment of the present invention. In the following description, assume that an active screen of a prescribed application program is initially outputted to the touchscreen 151 of the mobile terminal 100.

Referring to FIG. 4, while an active screen of a prescribed application program is outputted through the touchscreen 151, if a capture command is inputted [S401], the controller 180 extracts an activation information matching an active screen from the application program [S402] and may control a capture image of storing the activation information as metadata to be saved in the memory 160 [S403].

In this case, the activation information may include at least one of an activation context information and a page address. In the activation context information matching an active screen, at least one of an identification information of an application program corresponding to a source of the active screen as a capture target and an activity identification information matching the active screen as the capture target may be included. And, the page address may include a URL (uniform resource locator) address. Moreover, the activation context information and the page address are described in detail with reference to FIG. 5 as follows.

Figure 5A:
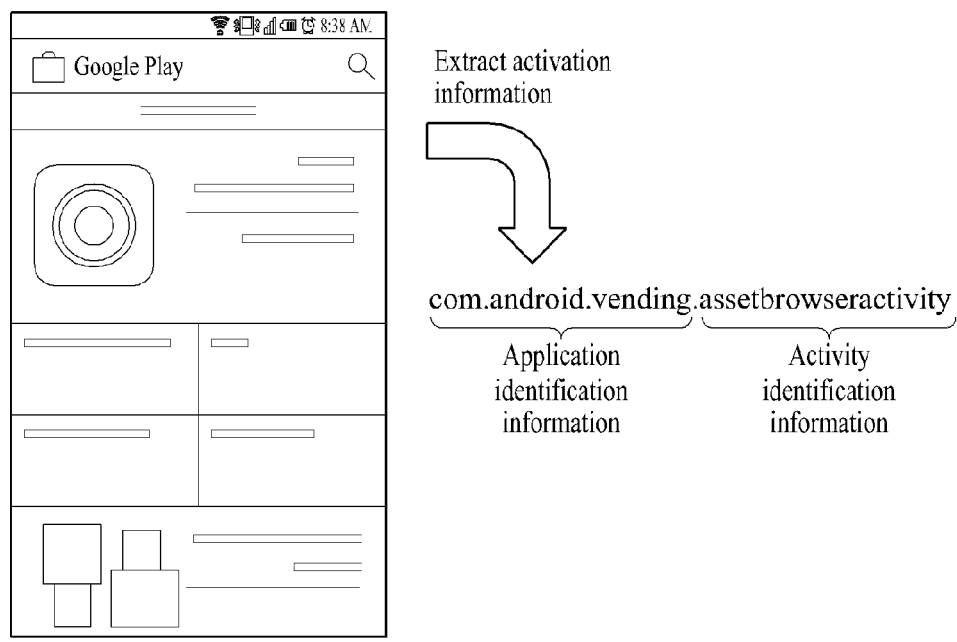
FIGS. 5A to 5C are diagrams of examples to describe a process for extracting activation information saved as metadata of a created capture image.
Figure 5B:
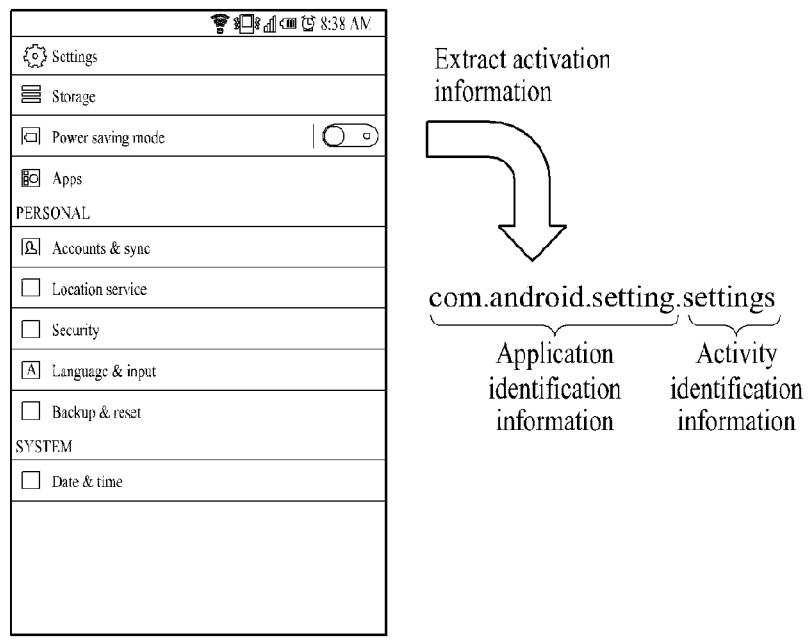
Figure 5C:
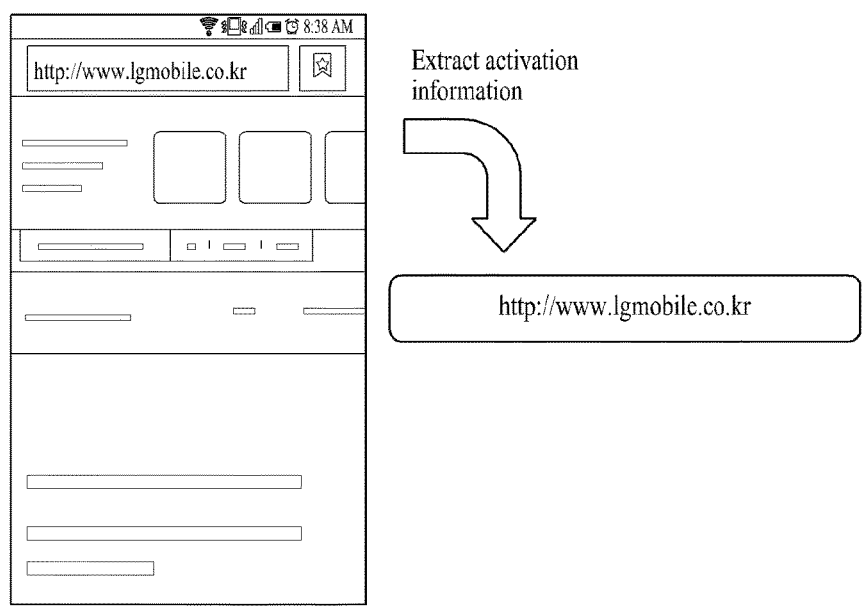

FIGS. 5A to 5C are diagrams of examples to describe a process for extracting activation information saved as metadata of a created capture image.

Referring to FIG. 5A, while a market application is running, if a capture command is inputted, the controller 180 can extract an identification information of the market application and an identification information of an activity for outputting an active screen of the market application shown in FIG. 5A. In particular, in the example shown in FIG. 5A, 'com.android.vending' located at an upper class is a package name of the market application and 'assetbrowseractivity' located at a lower class may be an identification information of an activity for displaying the active screen shown in FIG. 5A.

For another instance, referring to FIG. 5B, while a setting program for adjusting overall operations of the mobile terminal 100, if a capture command is inputted, the controller 180 can extract an identification information of the setting program and an identification information of an activity for outputting an active screen of the setting program shown in FIG. 5B. In particular, in the example shown in FIG. 5B, 'com.android.setting' located at an upper class is a package name of the setting program and 'settings' located at a lower class may be an identification information of an activity for displaying the active screen shown in FIG. 5B.

In FIG. 5A and FIG. 5B, the controller 180 can extract 'com.android.vending.assetbrowseractivity' and 'com.android.setting.settings' as activation context informations, respectively.

If an active screen as a target of capture is a webpage corresponding to a prescribed URL address, the controller 180 extracts the URL address of the webpage and then controls the URL address to be saved as metadata of a capture image. For instance, referring to FIG. 5C, while a webpage corresponding to a prescribed URL address is outputted through a web browser application, if a capture command is inputted, the controller 180 can control the URL address corresponding to the webpage as a capture target to be extracted.

In FIG. 5C, the controller 180 can extract 'http://www.lgmobile.co.kr' corresponding to the URL address of the webpage as a page information.

In the examples shown in FIG. 5A and FIG. 5B, a name of an application program may be further included in an activation information. In particular, in the example shown in FIG. 5A, the controller 180 can control at least one of 'market' to be included in the activation information. In the example shown in FIG. 5B, the controller 180 can control at least one of a text string of 'setting' to be included in the activation information. A name of an application program may be used to inform a user of an application program name associated with a capture image or to search a market server for the application program.

Once the activation information of the active screen is extracted, the controller 180 can control the extracted activation information to be saved as metadata of a capture image.

In the example shown in FIG. 4, the capture command may include an input applied by a user's external input in the course of outputting an active screen of a prescribed application program through the mobile terminal 100.

According to another embodiment of the present invention, the capture command shown in FIG. 4 may correspond to a capture command in handwritten input mode. In this case, the handwritten input mode enables a user to input a handwriting onto a background image. While an active screen of a prescribed application program is outputted through the mobile terminal 100, if a command for entering a handwritten input mode is inputted, the mobile terminal 100 can control a user to apply a handwritten input onto a background image generated from capturing an active screen of the prescribed application program. After the user's handwritten input is drawn onto the background image, if a capture command is inputted, the controller 180 can control a capture image, which is created from combining the background image and the user's handwritten input with each other, to be saved in the memory 160. In case of saving the capture image in the memory 160, as mentioned in the foregoing description with reference to FIG. 4, it is a matter of course that an activation information of an active screen (i.e., an active screen becoming a capture target of a background image), which becomes a capture target as metadata of a capture image, can be saved as metadata of the capture image.

Moreover, an embodiment of the mobile terminal 100 according to the present invention can be further extended depending on a user's handwritten input in handwritten input mode. An extensible operation of the mobile terminal 100 according to the present invention shall be described with reference to FIG. 6 as follows.

Figure 6:
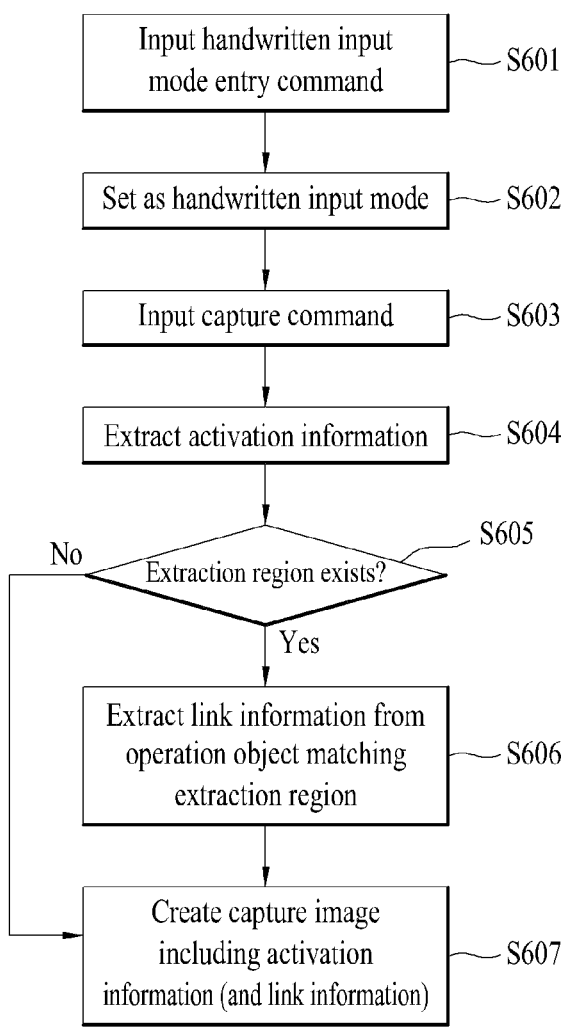
FIG. 6 is a flowchart for an operation of a mobile terminal in accordance with a handwritten input mode entry.

FIG. 6 is a flowchart for an operation of a mobile terminal in accordance with a handwritten input mode entry.

Referring to FIG. 6, if an enter command for entering a handwritten input mode is inputted [S601], the controller 180 controls an image of capturing an active screen of a prescribed application program to be displayed as a background image and is also able to set the mobile terminal 100 to enter a handwritten input mode for enabling a user to apply a handwritten input onto the background image [S602].

If a mode of the mobile terminal 100 is set to the handwritten input mode, a user can perform a handwritten input in a manner of applying a prescribed touch input to the touchscreen 151. In performing the handwritten input, the user may apply a $1^{st}$ handwritten input in $1^{st}$ handwriting mode or may apply a $2^{nd}$ handwritten input in $2^{nd}$ handwriting mode. The $1^{st}$ handwriting mode and the $2^{nd}$ handwriting mode shall be described with reference to FIG. 7 as follows.

Figure 7:
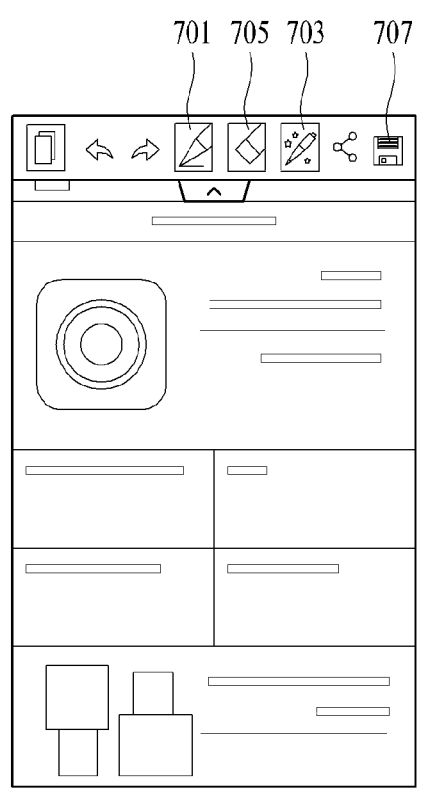
FIG. 7 is a diagram of one example to describe a $1^{st}$ handwriting mode and a $2^{nd}$ handwriting mode.

FIG. 7 is a diagram of one example to describe a $1^{st}$ handwriting mode and a $2^{nd}$ handwriting mode.

Referring to FIG. 7, if a mode of the mobile terminal is switched to a handwritten input mode, the controller 180 can control a $1^{st}$ pen icon 701, a $2^{nd}$ pen icon 703 and an eraser icon 705 to be displayed in order to enable a user's handwritten input. In the example shown in FIG. 7, the $1^{st}$ pen icon 701 may be provided to set a mode of the mobile terminal 100 to a $1^{st}$ handwriting mode and the $2^{nd}$ pen icon 703 may be provided to set a mode of the mobile terminal 100 to a $2^{nd}$ handwriting mode.

As the $1^{st}$ pen icon 701 is selected, while a mode of the mobile terminal 100 is set to the $1^{st}$ handwriting mode, if a user applies a touch input along a prescribed trace, the controller 180 can control a $1^{st}$ handwritten input to be drawn along the user-applied prescribed trace.

As the $2^{nd}$ pen icon 703 is selected, while a mode of the mobile terminal 100 is set to the $2^{nd}$ handwriting mode, if a user applies a touch input along a prescribed trace, the controller 180 can control a $2^{nd}$ handwritten input to be drawn along the user-applied prescribed trace.

In doing so, the $1^{st}$ handwritten input may be provided to enable a user to input a memo onto a capture image. And, the $2^{nd}$ handwritten input may be provided to extract a location information and a link information of an operation object matching an extraction region from an application program after setting the extraction region on a capture image.

The eraser icon 705 shown in FIG. 7 may be used to erase the $1^{st}$ handwritten input or the $2^{nd}$ handwritten input drawn on the capture image.

In the example shown in FIG. 7, the $1^{st}$ handwriting mode and the $2^{nd}$ handwriting mode are identified from each other by the $1^{st}$ pen icon 701 and the $2^{nd}$ pen icon 703, respectively. Yet, it may be unnecessary for the $1^{st}$ handwriting mode and the $2^{nd}$ handwriting mode to be identified from each other by different icons, respectively. The discrimination between the $1^{st}$ handwriting mode and the $2^{nd}$ handwriting mode can include various embodiments easily devisable by those skilled in the art as well as the type shown in FIG. 7. For instance, the $1^{st}$ handwriting mode and the $2^{nd}$ handwriting mode can be discriminated from each other by a manipulation of a stylus pen used for a handwritten input. For example, if a prescribed button is provided to a stylus pen to discriminate the $1^{st}$ handwriting mode and the $2^{nd}$ handwriting mode from each other, a handwritten input drawn without pressing the prescribed button may be set as the handwritten input applied in $1^{st}$ handwriting mode or a handwritten input drawn while pressing the prescribed button may be set as the handwritten input applied in $2^{nd}$ handwriting mode. Thus, the $1^{st}$ handwriting mode and the $2^{nd}$ handwriting mode can be identified from each other in various ways.

After completion of the user's handwritten input, if a capture command is inputted by the user [S603], the controller 180 extracts an activation information matching an active screen [S604], as shown in FIG. 4, and is then able to control a capture image, which has the extracted activation information saved as metadata, to be saved in the memory [S607]. In this case, the capture command may include the user input applied to a save button 707 shown in FIG. 7, by which the present invention may be non-limited. Moreover, the capture image may be created from capturing a background image and a user's handwritten input both. In case that both of the $1^{st}$ handwritten input and the $2^{nd}$ handwritten input are drawn on the background image, the controller 180 may control both of the $1^{st}$ handwritten input and the $2^{nd}$ handwritten input or the $1^{st}$ handwritten input except the $2^{nd}$ handwritten input to be selectively included in the capture image. Its details shall be described with reference to FIG. 9 later.

When the capture command is inputted by the user, if an extraction region designated by the $2^{nd}$ handwritten input exists on the background image [S605], the controller 180 extracts a region matching the extraction region designated by the $2^{nd}$ handwritten input from an active screen of a prescribed application program becoming a capture target (i.e., a capture target of the background image) and is then able to extract an operation object located within or closest to the extracted region and a link information of the operation object from the application program [S606]. If the operation object and the link information of the operation object are extracted from the application program, the controller 180 can control a location information of the operation object and the extracted link information of the operation object to be further saved as metadata of the capture image in a manner of being associated with each other [S607].

The process for setting the extraction region by the $2^{nd}$ handwritten input and the process for extracting the link information of the operation object located in the region matching the extraction region from the application program are described with reference to FIG. 8 as follows.

Figure 8:
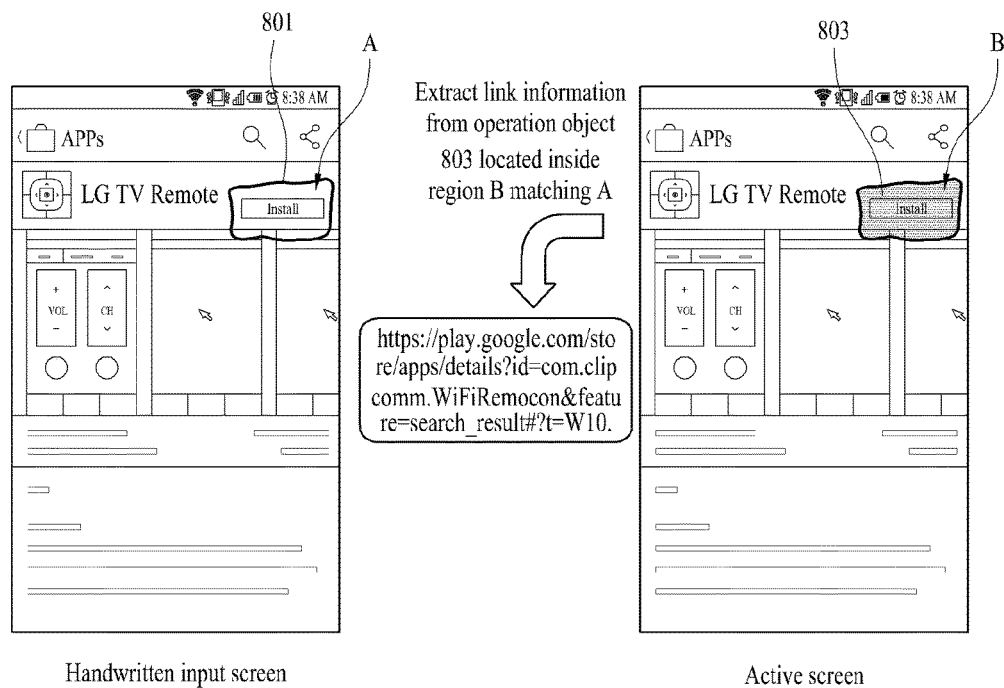
FIG. 8 is a diagram of one example to describe a process for extracting an operation object located in a region matching an extraction region set up by a $2^{nd}$ handwritten input and a link information of the operation object from an application program.

FIG. 8 is a diagram of one example to describe a process for extracting an operation object located in a region matching an extraction region set up by a $2^{nd}$ handwritten input and a link information of the operation object from an application program.

Referring to FIG. 8, a closed curve 801 drawn by a user's handwritten input is assumed as drawn in $2^{nd}$ handwriting mode. If the closed curve 801 is drawn by a $2^{nd}$ handwritten input in $2^{nd}$ handwriting mode, the controller 180 can set an inside of the closed curve 801 drawn by the $2^{nd}$ handwritten input as an extraction region A. Once the extraction region is set, the controller 180 determines an operation object within a region B, which is mapped to the extraction region A set through the capture image, or an operation object closest to the extraction region A by targeting an active screen becoming a capture target and is then able to control a location information of the determined operation object and a link information assigned to the operation object to be extracted.

In the example shown in FIG. 8, since a button 803 written as 'install' is located within the region B of the active screen mapped to the extraction region A, the controller 180 can extract a display region information (e.g., (x, y) coordinates information of 4 vertexes for the region for displaying the button 803) of the 'install' written button 803 and a link information assigned to the button 803 from an application program. If a URL address for paging an installation screen of a prescribed application is linked to the 'install' written button 803, referring to FIG. 8, the controller 180 can extract the URL address assigned to the 'install' written button 803 as the link information.

Like the example shown in FIG. 8, the operation object may include a button for switching an active screen of an application to another active screen within the same application program or an entity including a button or hyperlink for paging an active screen of another application program. Moreover, the link information assigned to the operation object may include at least one of an activation context information linked to the operation object to switch an active screen of an application program to another active screen, a URL (uniform resource locator) address referable to a web browser application, an email address linkable to an email application and a phone number linkable to a dial application.

In the example shown in FIG. 8, the $2^{nd}$ handwritten input forms the closed curve 801 and the inside of the closed curve 801 is set as the extraction region. Yet, it may be unnecessary for the $2^{nd}$ handwritten input to have a shape of the closed curve. Alternatively, the $2^{nd}$ handwritten input may have a dotted or lined shape instead of the closed curve shape. In this case, the controller 180 can control a link information of an operation object closest to coordinates of the $2^{nd}$ handwritten input to be extracted from the application program.

In case of creating a capture image from combining a background image and a handwritten input together in response to a capture command, the controller 180 may control the capture image to be created in a manner of combining both of the $1^{st}$ and $2^{nd}$ handwritten inputs and the background image together, by which the present invention may be non-limited.

According to another embodiment of the present invention, the controller 180 can control a capture image to be created in a manner of combining either a 1st handwritten input or a $2^{nd}$ handwritten input with a background image. This is described in detail with reference to FIG. 9 and FIG. 10 as follows.

Figure 9:
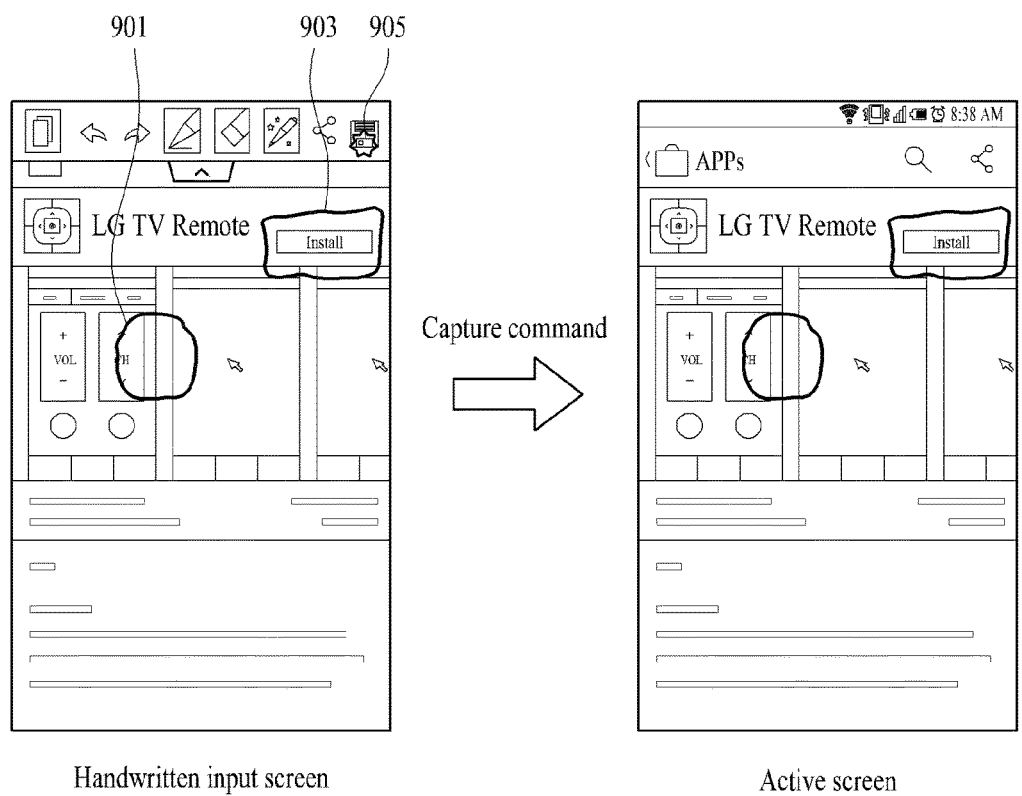
FIG. 9 is a diagram of one example to describe correlation of a 1st handwritten input, a $2^{nd}$ handwritten input and a capture image.

FIG. 9 is a diagram of one example to describe correlation of a $1^{st}$ handwritten input, a $2^{nd}$ handwritten input and a capture image. And, FIG. 10 is a diagram of another example to describe correlation of a $1^{st}$ handwritten input, a $2^{nd}$ handwritten input and a capture image.

For clarity of the following description, assume that a handwritten input represented as a circular trace is a $1^{st}$ handwritten input 901/1001 applied in $1^{st}$ handwriting mode. And, assume that a handwritten input represented as a quadrangular trace is a $2^{nd}$ handwritten input 903/1003 applied in $2^{nd}$ handwriting mode.

While a $1^{st}$ handwritten input 901 and a $2^{nd}$ handwritten input 903 are inputted onto a background image, if a capture command is inputted (e.g., a save button 905 shown in FIG. 9 is touched), referring to FIG. 9, the controller 180 of the mobile terminal 100 according to one embodiment of the present invention can control a capture image to be created in a manner of combining both of the $1^{st}$ and $2^{nd}$ handwritten inputs 901 and 903 and the background image together.

Figure 10:
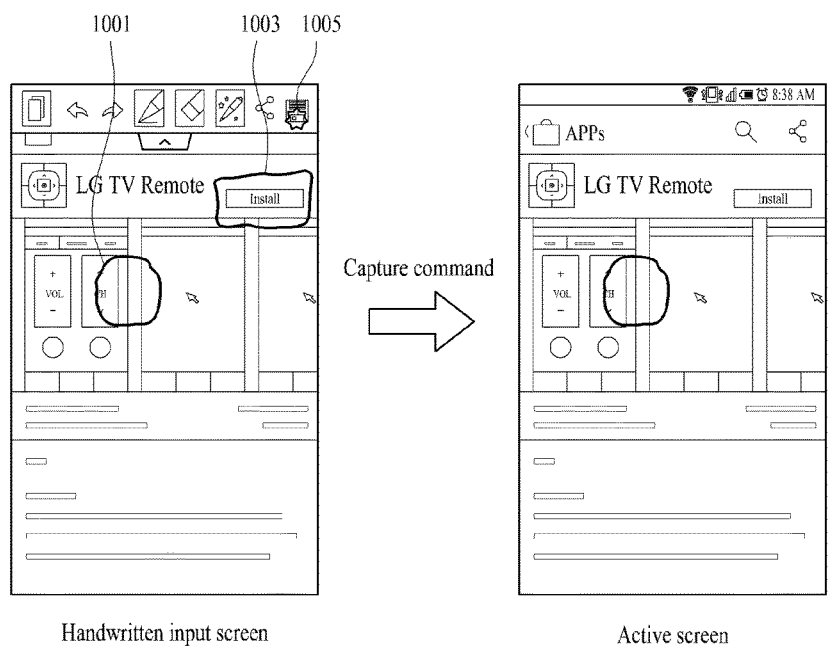
FIG. 10 is a diagram of another example to describe correlation of a 1st handwritten input, a $2^{nd}$ handwritten input and a capture image.

While a 1st handwritten input 1001 and 2nd handwritten input 1003 are inputted onto a background image, if a capture command is inputted (e.g., a save button 1005 shown in FIG. 10 is touched), referring to FIG. 10, the controller 180 of the mobile terminal 100 according to another embodiment of the present invention can control a capture image to be created in a manner of combining the 1st handwritten input 1001 and the background image except the 2nd handwritten input 1003. In doing so, the 1st handwritten input 1001 may play a role in recording information through a handwriting and the 2nd handwritten input 1003 may play a role in extracting a link information of an operation object.

In the embodiments shown in FIG. 4 and FIG. 6, if an active screen of a prescribed application program becoming a target of a capture includes a setting menu, the controller 180 further extracts a setting information of the application program and can control the extracted setting information to be further included in metadata of a capture image. This is described in detail with reference to FIG. 11 as follows.

FIGS. 11A to 11D are diagrams of examples to describe a process for extracting setting information of an application program.

Figure 11A:
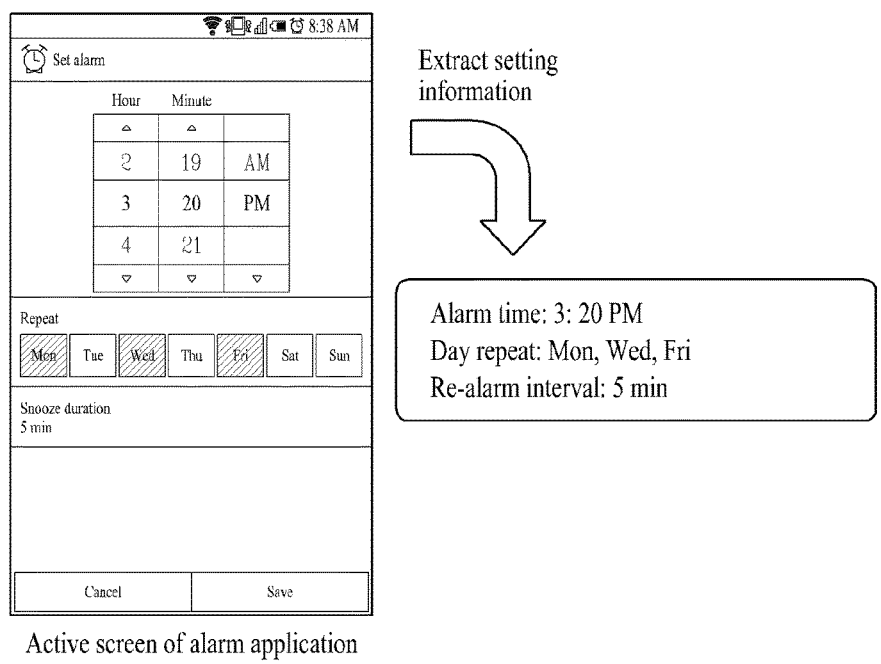
FIGS. 11A to 11D are diagrams of examples to describe a process for extracting setting information of an application program.

Referring to FIG. 11A, if an active screen including a setting menu for adjusting an alarm time, a day repeat, a re-alarm (snooze) and vibration output on/off through an alarm application is selected as a capture target, the controller 180 can extract setting values of the alarm time, day repeat, the re-alarm interval and the like, which are adjusted through the setting menu, as setting information. For instance, in the example shown in FIG. 11A, the setting information can include the setting values including the alarm time set to 03:02 PM, the day repeat set to Monday, Wednesday and Friday, the re-alarm interval set to 5 minutes, and the like.

Figure 11B:
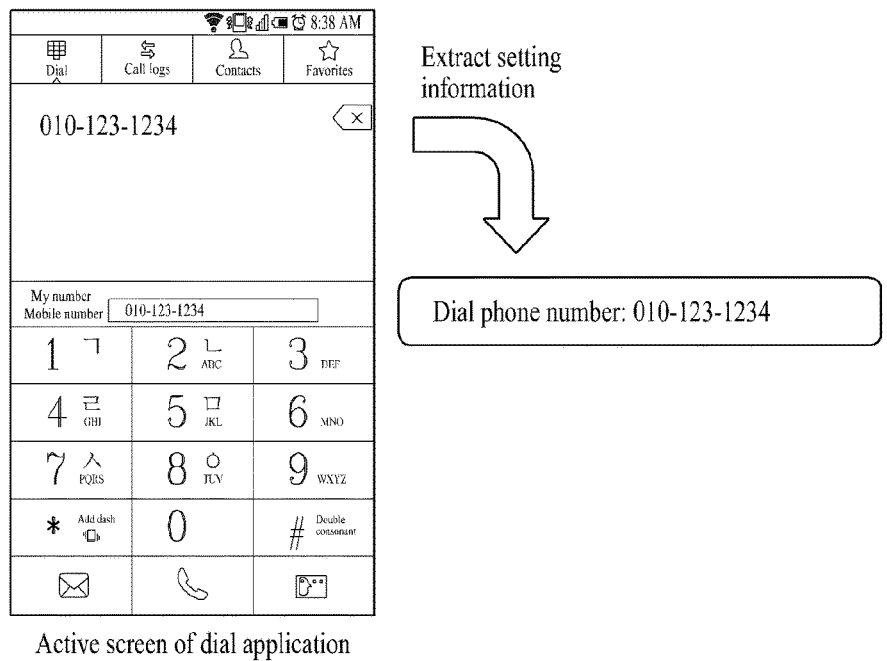

For another instance, referring to FIG. 11B, if a dial screen in a state having a prescribed phone number inputted through a dial application is selected as a capture target, the controller 180 can extract the prescribed phone number inputted by a user as the setting information.

Figure 11C:
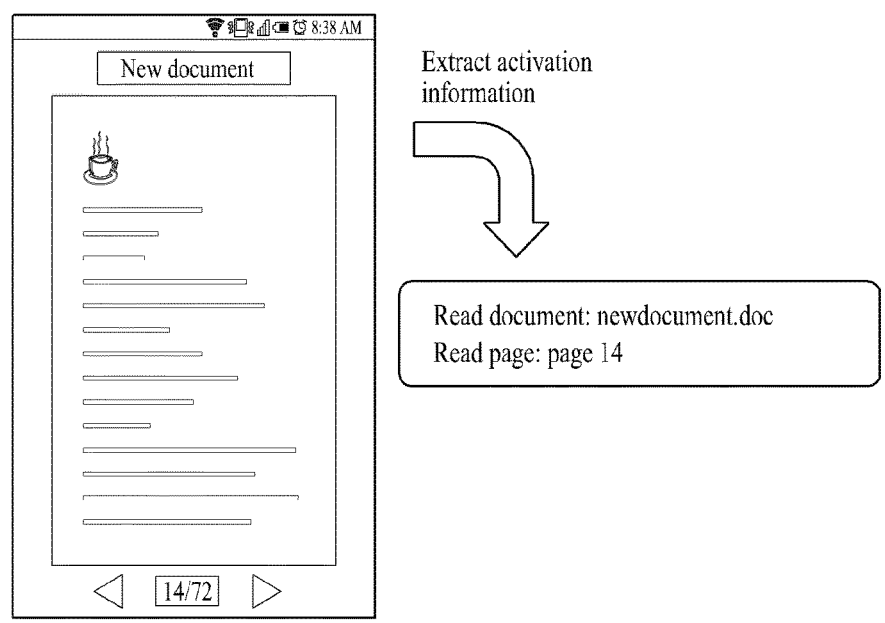

For another instance, referring to FIG. 11C, if an active screen of outputting a prescribed document through an e-book application is selected as a capture target, the controller 180 can extract a file information and output page of the prescribed document outputted through the e-book application as the setting information.

Figure 11D:
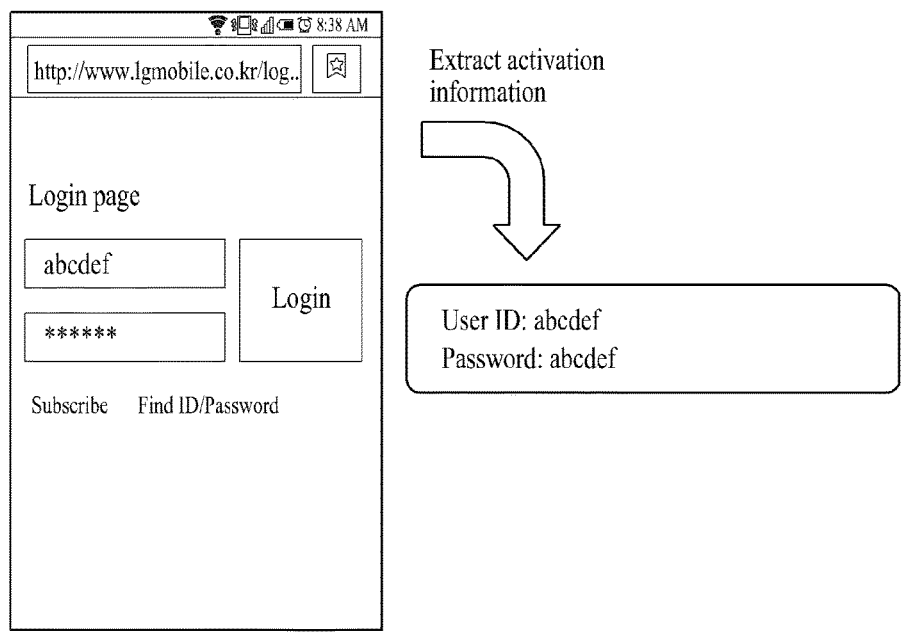

For further instance, referring to FIG. 11D, if a login page in a state having a login information (e.g., user ID & password) inputted through a web browser application is selected as a capture target, the controller 180 can extract the user-inputted login information as the setting information.

Like the examples shown in FIGS. 11A to 11D, a setting value or user-inputted value of an item adjustable in response to a user input is extracted as setting information from an active screen becoming a capture target and can be then controlled to be saved as metadata of capture data.

In the embodiments shown in FIG. 4 and FIG. 6, in case that a capture image is saved in the memory 160, the controller 180 can control a deleting condition of a capture image to be added in response to a user input. For instance, if a capture command is inputted by a $1^{st}$ user input, the controller 180 can control a capture image to be created without addition of the deleting condition. If a capture command is inputted by a $2^{nd}$ user input, the controller 180 can control the deleting condition of the capture image to be added.

For instance, the $1^{st}$ user input may include a touch release within a prescribed time after a save button for inputting a capture command has been touched in the example shown in FIG. 7. And, the $2^{nd}$ user input may include a touch release after a prescribed time elapsing from touching the save button.

If the capture command by the 2$^{nd}$ user input is inputted, the controller 180 may set up a deleting condition of the capture image based on a user input. In this case, the deleting condition may include a designation of a valid time of the capture image, or may include a designation of a maximum inquiry-available count of the capture image. Alternatively, the deleting condition may include the designation of both of the valid time and the maximum inquiry-available count.

In case that the deleting condition relates to a valid time, a capture image may be automatically deleted if a current hour reaches the valid time of the capture image. In case that the deleting condition relates to a maximum inquiry-available count, the controller 180 can control an inquiry count of the capture image to be incremented each time the capture image is read. Thereafter, if the inquiry count of the capture image reaches the maximum inquiry-available count, the controller 180 can control the capture image to be automatically deleted.

In case that both of the valid time and the maximum inquiry-available count are designated as the deleting condition, the capture image may be deleted if either the valid time or the maximum inquiry-available count or both of the valid time and the maximum inquiry-available count are met.

While the deleting condition is set to the maximum inquiry-available count of the capture image, if the capture image is transmitted to a different mobile terminal 100, the inquiry count of the capture image in the former mobile terminal 100 can be transferred to the different mobile terminal 100 or may be reset.

For instance, while the maximum inquiry-available count of a capture image is set to 5 times, if the mobile terminal 100 transmits the capture image to a different mobile terminal 100 after the capture image has been inquired 2 times, a maximum count of inquiring the capture image in the different mobile terminal is reset to 5 times or may correspond to 3 times resulting from excluding the inquiry count '2 times' in the former mobile terminal 100.

In the example shown in FIG. 6, the controller 180 extracts the activation information from the active screen becoming the capture target [S604], determines a presence or non-presence of the extraction region [S605], and then extracts the link information [S606]. Yet, it is not mandatory for the mobile terminal 100 according to the present invention to follow the sequence shown in FIG. 6.

For instance, after a presence or non-presence of the extraction region has been determined, the activation information and the link information can be extracted. And, the step of determining the presence or non-presence of the extraction region and the step of extracting the link information can be performed in parallel with the step of extracting the activation information.

In the following description, an operation of the mobile terminal 100 in saving a capture image is explained.

<Mobile Terminal Configured to Save Capture Image>

Figure 12:
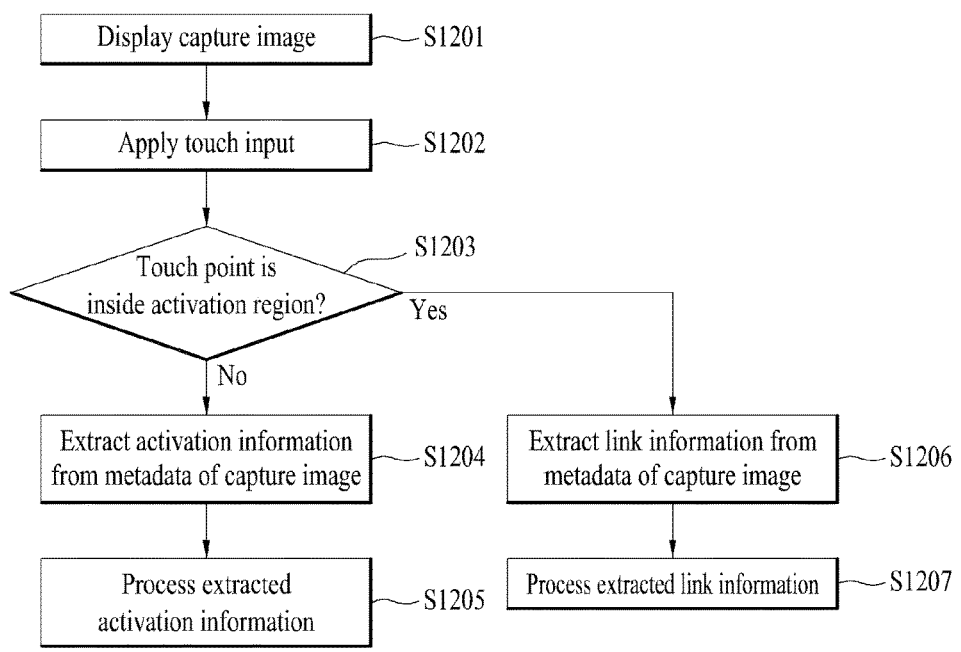
FIG. 12 is a flowchart for operation of a mobile terminal according to one embodiment of the present invention.

FIG. 12 is a flowchart for operation of a mobile terminal according to one embodiment of the present invention. Assume that the mobile terminal 100 described with reference to FIG. 12 saves a capture image initially created by the process shown in FIG. 4 or FIG. 6 in the memory 160. In this case, the capture image may be created by the mobile terminal 100 itself. Alternatively, the capture image is created by a different mobile terminal 100 and then received by the former mobile terminal 100.

Referring to FIG. 12, if a user requests a display of a capture image saved in the memory 160, the controller 180 can control a user-selected capture image to be displayed on the touchscreen 151 [S1201].

In displaying the capture image, the controller 180 parses metadata of the capture image and is then able to check a presence or non-presence of a location information of an operation object in the metadata. If the location information of the operation object exists in the metadata, the controller 180 sets a region designated by the location information of the operation object as an activation region and is then able to control the activation region to be visually discriminated from other regions in displaying the capture image.

This is described in detail with reference to FIG. 13 as follows.

Figure 13:
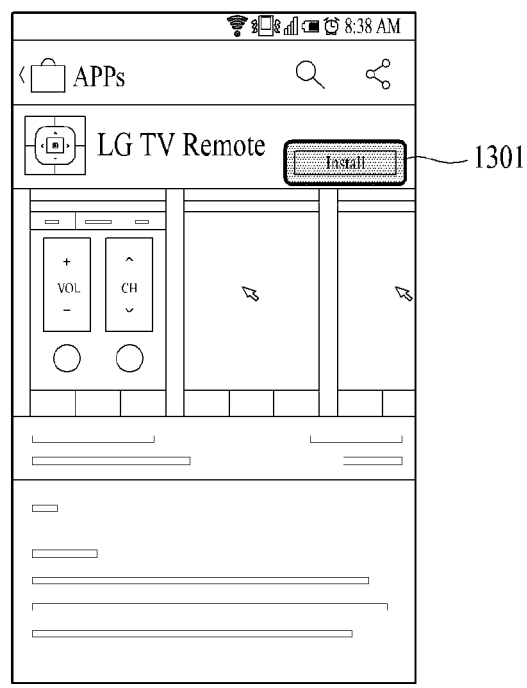
FIG. 13 is a diagram of one example to describe a process for discriminating a display region of an operation object from other regions visually.

FIG. 13 is a diagram of one example to describe a process for discriminating a display region of an operation object from other regions visually.

If a location information of an operation object is parsed from metadata of a capture image, the controller 180 sets a region corresponding to a display location of the operation object as an activation region and is then able to control the activation region to be visually discriminated. For instance, referring to FIG. 13, the controller 180 controls a button 1301 having a prescribed outline to be displayed in a manner of overlaying the activation region, thereby controlling the activation region to be visually discriminated.

Like the example shown in FIG. 13, if the activation region is controlled to be visually identifiable, it is able to guide a user-selectable region through a capture image.

While the capture image is displayed on the touchscreen 151, if a touch input is applied onto the capture image [S1202], the controller 180 can control an operation of the mobile terminal 100 depending on whether the touch input is applied inside or outside the activation region [S1203]. In particular, if a user's touch point is outside the activation region, the controller 180 extracts an activation information of the capture image by parsing metadata of the capture image [S1204] and is then able to control an operation matching the extracted activation information to be activated [S1205]. In this case, the operation matching the activation information may include an activation of an application program or activity designated by an activation context information, an output of a webpage indicated by a page address through a web browser application, or the like.

A process for performing the operation matching the activation information through the mobile terminal 100 is described with reference to FIG. 14A and FIG. 14B as follows.

Figure 14A:
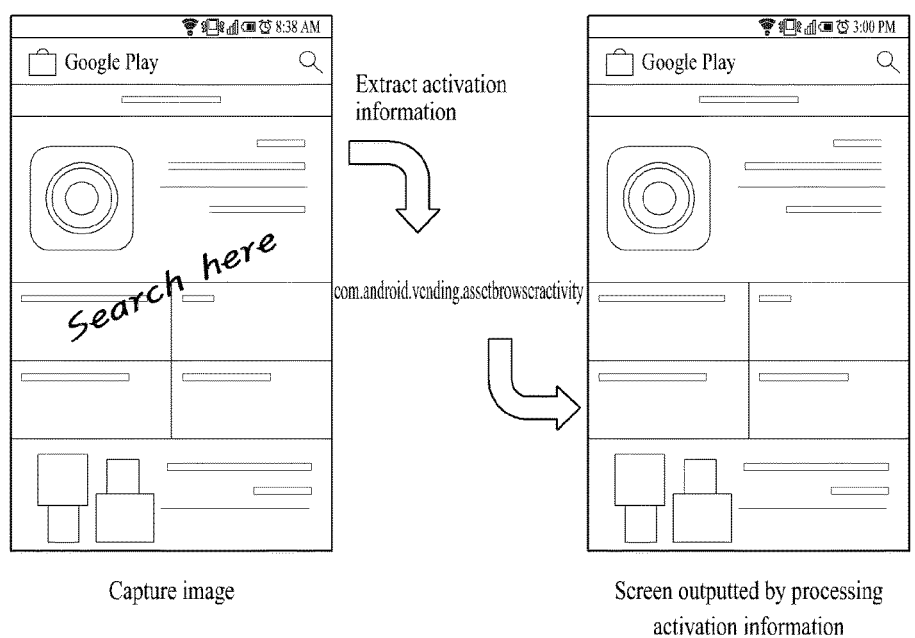
FIG. 14A and FIG. 14B are diagrams of examples to describe a process for performing an operation matching an activation context information or a page address through a mobile terminal.
Figure 14B:
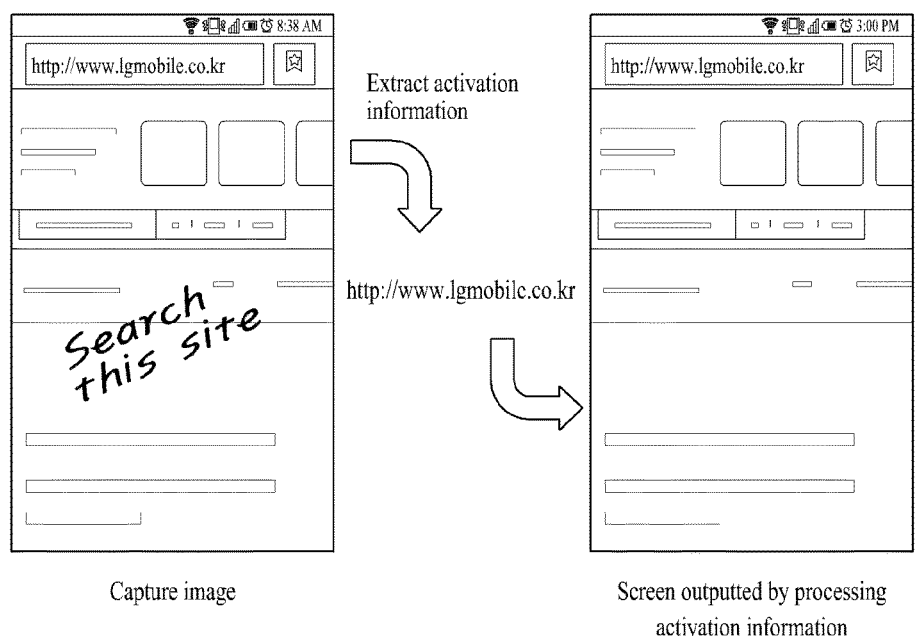

FIG. 14A and FIG. 14B are diagrams of examples to describe a process for performing an operation matching an activation context information or a page address through a mobile terminal.

Referring to FIG. 14A, if an identification information of an application program and an activity identification information are extracted from metadata of a capture image, the controller 180 activates the application program corresponding to the identification information of the application program and controls an activity indicated by the activity identification information to be outputted through the touchscreen 151.

For instance, if an activation context information extracted from the capture image is 'com.android.vending.assetbrowseractivity', referring to FIG. 14A, the controller 180 activates a market application corresponding to 'com.android.vending' and is also able to control an activity named 'assetbrowseractivity' to be outputted as an active screen.

Referring to FIG. 14B, if a page information is extracted from metadata of a capture image, the controller 180 activates a web browser application and is also able to control a webpage corresponding to the extracted page information to be outputted through a web browser.

For instance, referring to FIG. 14B, if the page information extracted from the metadata of the capture image is 'http://www.lgmobile.co.kr', the controller activates a web browser application and is also able to make a request for an access to an extracted URL address.

In particular, activation context information or page information saved as metadata of a capture image may be used for the mobile terminal 100 to output an active screen identical to the capture image. In more particular, a user touches a touch image, thereby controlling an active screen, which becomes a capture target on creating the capture image, of a prescribed application program to be outputted.

In the example shown in FIG. 14A, if the activation context information is extracted from the capture image, the controller 180 can activate the application program and activity indicated by the activation context information. In doing so, if an application program indicated by the activation context information is not installed on the mobile terminal 100, the controller 180 can control the wireless communication unit 110 to access a market server to download and install the corresponding application program. This is described in detail with reference to FIG. 15 as follows.

Figure 15:
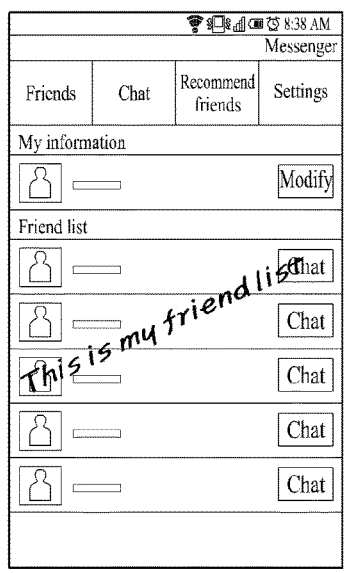
FIG. 15 is a diagram of one example to describe a process for displaying an installed page installable by downloading an application program.
Figure 15:
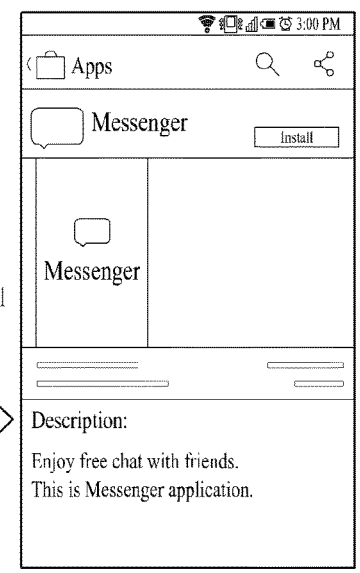

FIG. 15 is a diagram of one example to describe a process for displaying an installed page installable by downloading an application program. For clarity of the following description, assume that a capture image is created from capturing an active screen of an application named 'messenger'. Assume that an active screen becoming a capture target can be implemented through an application package name 'com.android.messenger' and an activity name 'activity1'.

Referring to FIG. 15, if a user touch input is applied to a capture image, the controller 180 can extract an activation context information 'com.android.messenger.activity1' from metadata of a capture image. Hence, the controller 180 can attempt an activation of an application having a package name 'com.android.messenger'.

If the application having the package name 'com.android.messenger' is installed on the mobile terminal 100, the controller activates the application and is also able to attempt an activation of an activity named 'activity1'.

On the other hand, if the application having the package name 'com.android.messenger' is not installed on the mobile terminal 100, the controller 180 controls the wireless communication unit 110 to access a market server by activating a market application and is also able to control an installation page for guiding installation of a messenger application to be displayed on the touchscreen 151. In particular, the controller 180 provides a messenger server with the package name of the application 'com.android.messenger' or a name of application 'messenger', receives an installation page of the application 'messenger' as a feedback of the provision, and is then able to control the received installation page to be displayed through the touchscreen 151.

Hence, the controller 180 facilitates a user to install an application program becoming a capture target of a capture image.

In the above description with reference to FIG. 14 and FIG. 15, if a location of a user's touch input to a capture image is outside an activation region, an operation of the mobile terminal 100 is explained.

On the contrary, if a location of a user's touch input to a capture image is inside an activation region, the controller 180 extracts a link information linked to the activation region by parsing metadata of the capture image [S1206] and is then able to control an operation matching the extracted link information to be activated [S1207]. In this case, the operation matching the link information may mean one of activation of an application program and activity designated by an activation context information indicated by the link information, activation of a web browser for accessing a URL address indicated by the link information, activation of an email application for writing a mail to a destination set to an email address indicated by the link information, activation of a dial application for attempting a call to a phone number indicated by the link information, and the like. This is described in detail with reference to FIGS. 16A to 16D as follows.

FIGS. 16A to 16D are diagrams to describe a process for performing an operation matching a link information through a mobile terminal.

Figure 16A:
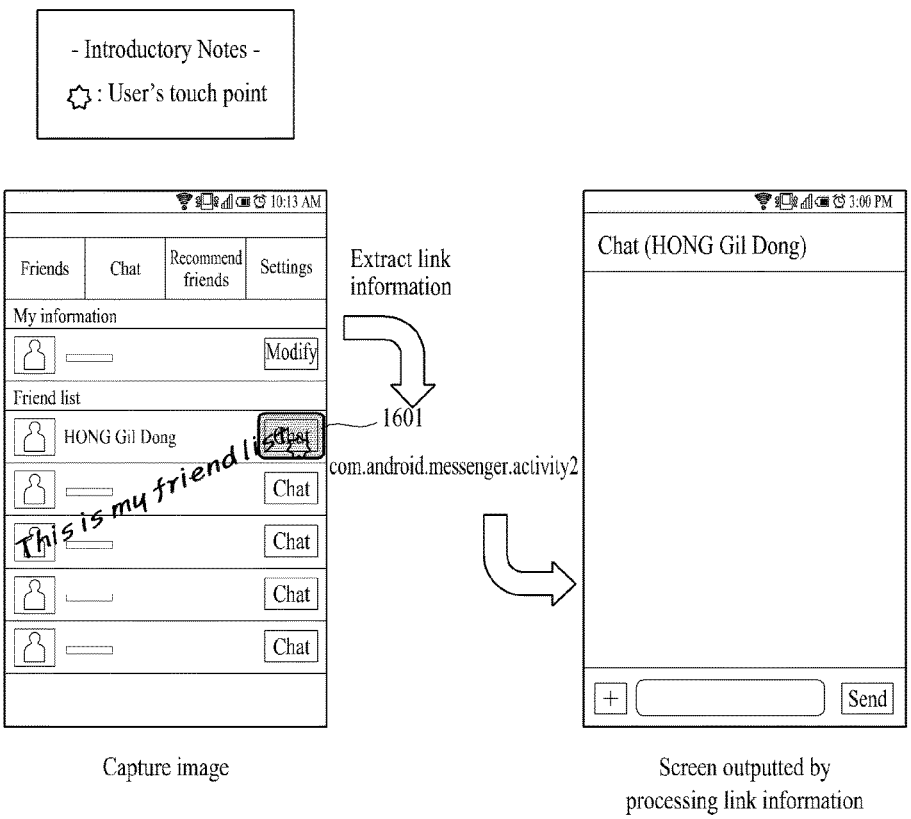
FIGS. 16A to 16D are diagrams to describe a process for performing an operation matching a link information through a mobile terminal.

For clarity of the following description, in FIG. 16A, assume that an activation context information of an application program used to be a target of a capture on creating a capture image is 'com.android.messenger.activity1'. And, assume that an activation context information indicated by a link information linked to an activation region is 'com.android.messenger.activity2'.

In the example shown in FIG. 16A, if a user input is applied to an outside of an activation region 1601 of a capture image, as mentioned in the foregoing description with reference to FIG. 14A, the controller 180 activates an application program having a package name 'com.android.messenger' and is also able to control an activity named 'activity1' to be activated. On the other hand, if a user input is applied to an inside of an activation region 1601 of a capture image, the controller 180 controls an activation context information indicated by the link information linked to the activation region 1601 to be activated. In particular, the controller 180 activates an application program named 'com.android.messenger' and is also able to control an activity named 'activity2' to be activated.

In particular, a command linked to a prescribed operation object of a prescribed application program is saved in metadata of a capture image, whereby a user is able to control the command assigned to the prescribed operation object to be simply activated through the capture image without running the prescribed application program.

If the application program indicated by the activation context information of the link information is not installed on the mobile terminal 100, as mentioned in the foregoing description with reference to FIG. 15, an installation page for downloading and installing an application program may be displayed.

Figure 16B:
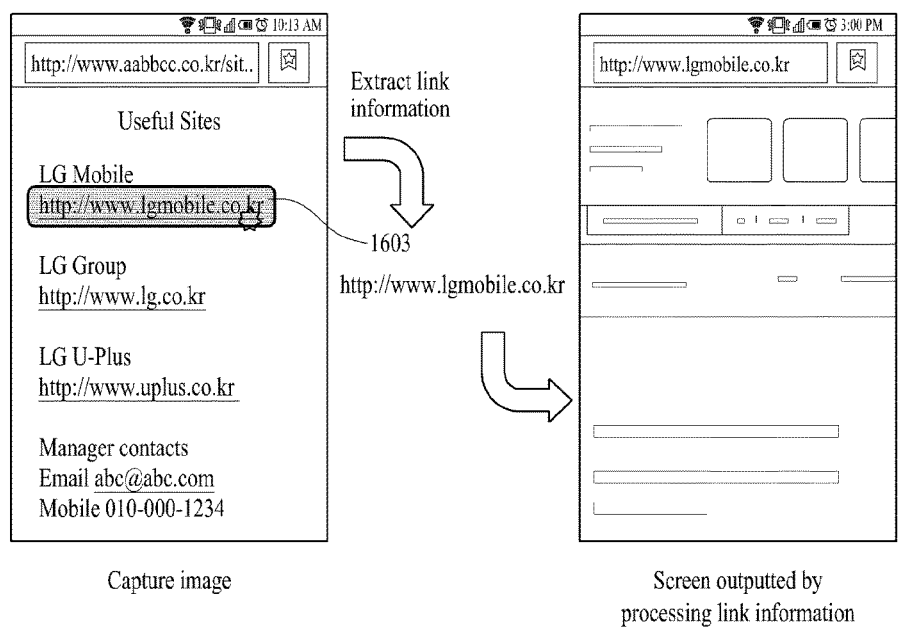

In the example shown in FIG. 16B, assume that a link information linked to an activation region 1603 is a URL address 'http://www.lgmobile.com'. If a user's touch input is applied to an inside of the activation region 1603 in the capture image shown in FIG. 16B, referring to FIG. 16B, the controller 180 activates a web browser application and is also able to attempt an access to 'http://www.lgmobile.com' corresponding to a URL indicated by the link information.

Figure 16C:
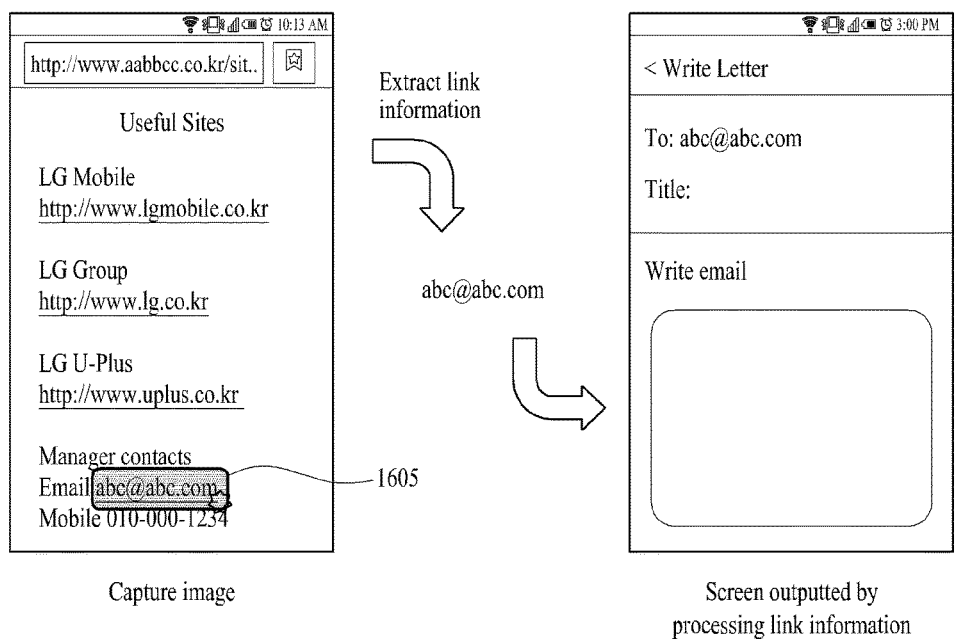

In the example shown in FIG. 16C, assume that a link information linked to an activation region 1605 is an email address 'abc@abc.com'. If a user's touch input is applied to an inside of the activation region 1605 in the capture image shown in FIG. 16C, referring to FIG. 16C, the controller 180 activates an email application and is also able to control an email writing screen, on which the email address 'abc@abc.com' indicated by the link information is designated as a recipient, to be displayed.

Figure 16D:
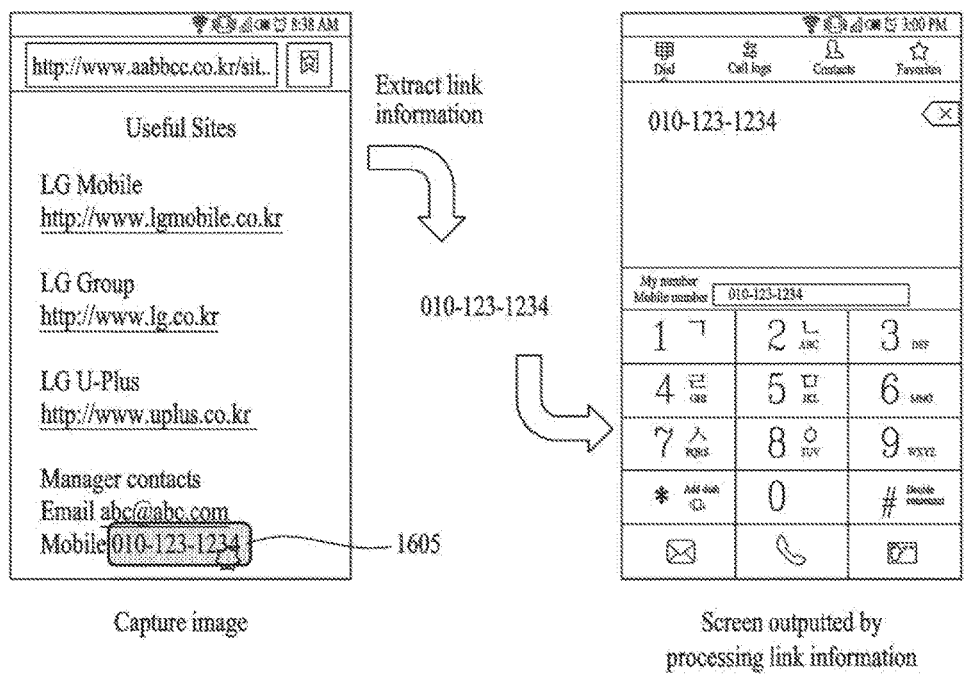

In the example shown in FIG. 16D, assume that a link information linked to an activation region 1607 is a phone number '010-123-1234'. If a user's touch input is applied to an inside of the activation region 1607 in the capture image shown in FIG. 16D, referring to FIG. 16D, the controller 180 activates a dial application and is also able to control a dial screen, on which the phone number '010-123-1234' indicated by the link information is set as a recipient number, to be displayed.

Like the examples shown in FIGS. 11A to 11D, if an activation region is touched, a link information linked to the activation region is controlled to be processed. Therefore, a button displayed as an image on a capture image or an entity including a hyperlink can be controlled to play a role as a real button.

In case that setting information is further included in metadata of a capture image, the controller 180 activates an operation matching an activation information or a link information and is also able to control the setting information to be applied.

This is described in detail with reference to FIGS. 17A to 17D as follows.

FIGS. 17A to 17D are diagrams of examples to describe a process for applying setting information while an operation matching an activation information or a link information is performed.

Figure 17A:
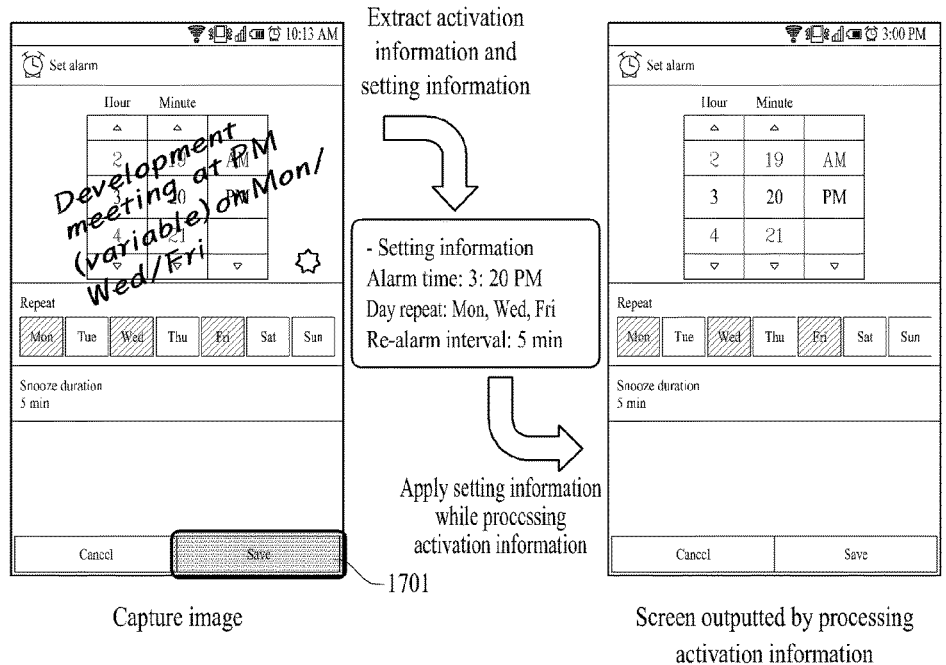
FIGS. 17A to 17D are diagrams of examples to describe a process for applying setting information while an operation matching an activation information or a link information is performed.

Referring to FIG. 17A, if a user's touch input is applied onto a capture image created from capturing an active screen of an alarm application, the controller 180 extracts an activation information from metadata of the capture image and then controls an operation matching the activation information to be activated. In particular, in the example shown in FIG. 17A, the controller 180 activates the alarm application and is also able to control a setting screen for setting an alarm time and the like to be displayed. In doing so, the controller 180 can control the setting values, which are displayed on the setting screen of the alarm application, to be automatically adjusted in accordance with the setting information extracted from the metadata.

For instance, if the setting information includes an alarm time set to 03:20 PM, day repeats set to Monday, Wednesday and Friday, a re-alarm interval set to 5 minutes and the like, the controller 180 can control the setting values indicated by the setting information to be entirely applied to the setting screen of the alarm application.

In the example shown in FIG. 17A, while a 'save' button is set as an activation region 1701, if a user applies a touch input to an inside of the activation region 1701 in which the 'save' button is located, the controller 180 applies the setting values adjusted in accordance with the setting information and is also able to control a link information linked to the 'save' button to be processed. Therefore, the controller 180 controls the alarm time to be set to 03:20 PM, controls the day repeats to be set to Monday, Wednesday and Friday, and controls the re-alarm interval to be set to 5 minutes, as indicated by the setting information.

Using the capture image shown in FIG. 17A, the setting values used to be applied to the active screen becoming the capture target can be entirely applied without user's separate adjustment of the alarm time and the like.

Figure 17B:
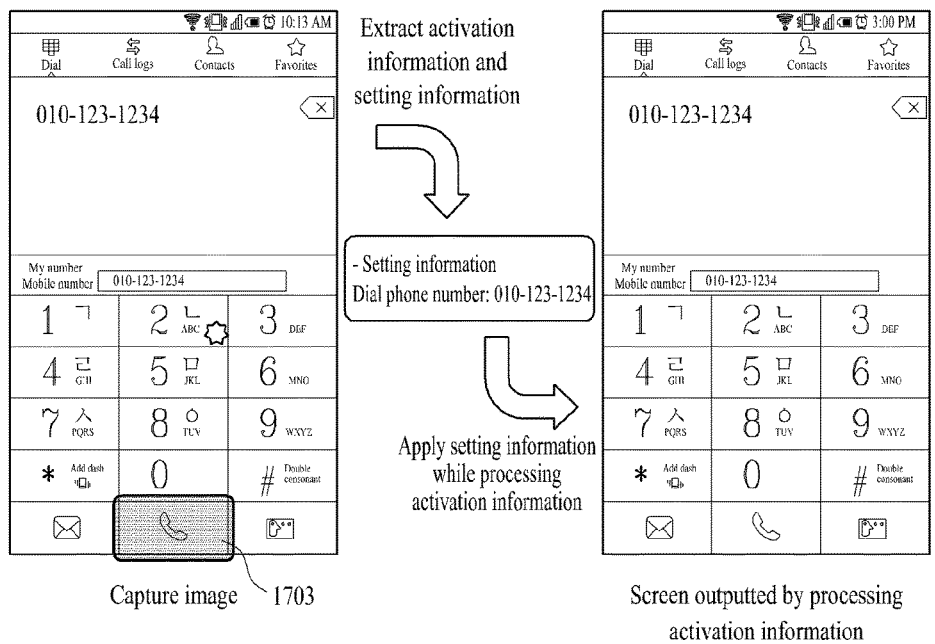

Referring to FIG. 17B, if a touch input is applied to a capture image created from capturing a dial screen in a state that a prescribed phone number is inputted through a dial application, the controller 180 activates the dial application and is also able to control a phone number set to a setting information to be automatically inputted. In particular, the controller 180 can control a phone number to be automatically inputted by a touch to the capture image only despite that a user does not directly input a phone number displayed as an image on the capture image.

In the example shown in FIG. 17B, while a 'call' button 1703 is set as an activation region 1703, if a user applies a touch input to an inside of the activation region 1703 in which the 'call' button is located, the controller 180 applies the setting value indicated by the setting information and is also able to control a link information linked to the 'call' button to be processed. In particular, the controller 180 can control a call connection to the phone number '010-123-1234' indicated by the setting information to be attempted.

Figure 17C:
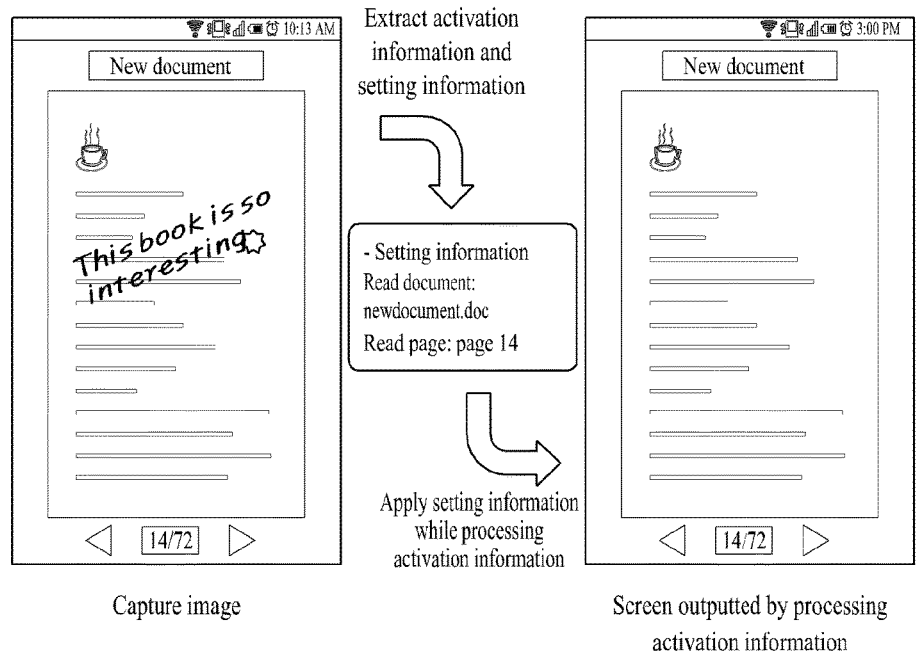

For another instance, referring to FIG. 17C, if a touch input is applied to a capture image created from capturing an active screen of outputting a prescribed document through an e-book application, the controller 180 activates the e-book application, pages a prescribed document file saved as the setting information, and is also able to control a last read output page to be unfolded.

Figure 17D:
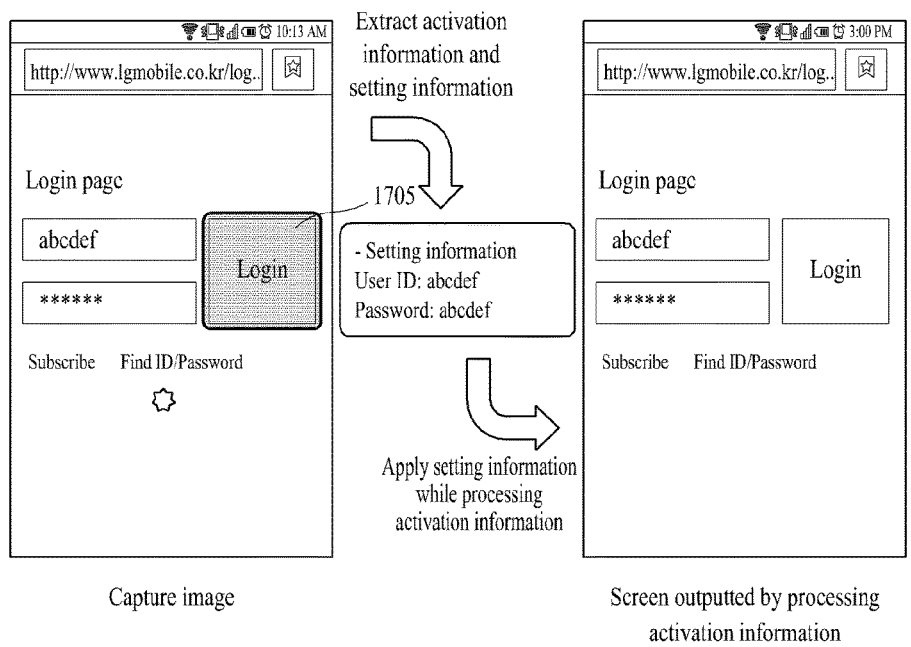

For another instance, referring to FIG. 17D, if a touch input is applied to a capture image created from capturing a login page in a state that a login information (e.g., user ID & password) is inputted through a web browser application, the controller 180 accesses a login page through a web browser and is also able to control an ID and password indicated by the setting information to be inputted to an input window. In particular, the controller 180 can control the ID and password to be automatically inputted by a touch to the capture image only despite that a user does not directly input an ID and password displayed as an image on the capture image. Moreover, the controller 180 controls a login procedure to be performed using the setting information of the capture image, thereby guiding a counterpart's login without exposing the password to the counterpart.

In the example shown in FIG. 17D, while a 'login' button is set as an activation region 1705, if a user applies a touch input to an inside of the activation region 1705 in which the 'login' button is located, the controller 180 applies the setting value indicated by the setting information and is also able to control a link information linked to the 'login' button to be processed. In particular, the controller 180 can control a user login to be processed using the ID and password indicated by the setting information.

In the examples shown in FIGS. 17A to 17D, if setting information is further included in metadata, the controller 180 activates an operation matching an activation information or a link information and is also able to apply the setting information. In doing so, if an application program (particularly, an activation context information) indicated by the activation information is not installed, as mentioned in the foregoing description with reference to FIG. 15, the controller 180 can control the wireless communication unit 110 to access a market server to download and install the corresponding application program. Moreover, the controller 180 can control a setting information extracted from a capture image to keep being saved in the memory 160 until the application program is installed and run initially at least.

Through this, after the installation of the application program has been completed through the market server, if the application program is initially activated, the controller 180 can control the setting information extracted from the capture image to be automatically applied to the initially activated application program. In particular, although the application program is not directly activated from the capture image, if the application program is installed/activated through the capture image, the controller 180 can control the setting information extracted from the capture image to be directly applied to the application program.

In the example shown in FIG. 12, if the activation region is not set in the capture image, the step S1203 of determining whether the touch input is applied to the inside of the activation information and the steps S1206 and S1207 of adjusting the operation of the mobile terminal 100 in accordance with the link information may be omitted.

Moreover, after the deleting condition has been set for the capture image, if a situation matching the deleting condition occurs, the controller 180 may control the capture image to be automatically deleted.

Prior to the description with reference to FIG. 12, the capture image initially created by the process shown in FIG. 4 or FIG. 6 is assumed as saved in the memory 160 of the mobile terminal 100. Furthermore, while a prescribed web server stores a capture image created by the process shown in FIG. 4 or FIG. 6, if the mobile terminal 100 reads the capture image stored in the web server (i.e., corresponding to the step S1201), the operation shown in FIG. 12 may be applicable thereto. In particular, even if the capture image stored in the web server is temporarily saved in the memory 160, the operation shown in FIG. 12 may be applicable.

In the examples shown in the accompanying drawings, a single activation region is set for a capture image. Yet, it may not be mandatory for a single activation region to be set for the capture image. In response to a $2^{nd}$ handwritten input, a plurality of activation regions may be set for a capture image. In this case, the controller 180 may control a link information to be extracted from each of a plurality of the activation regions.

For instance, while a capture image including a $1^{st}$ activation region and a $2^{nd}$ activation region is displayed, if a touch input is applied to an inside of the $1^{st}$ activation region. The controller 180 may control a $1^{st}$ link information linked to the $1^{st}$ activation region to be activated. If a touch input is applied to an inside of the $2^{nd}$ activation region, the controller 180 may control a $2^{nd}$ link information linked to the $2^{nd}$ activation region to be activated.

Meanwhile, it may not be mandatory for an operation of the mobile terminal 100 according to the present invention to be performed by the mobile terminal 100 equipped with Android Operating System. And, the present invention is applicable to mobile terminals in various environments having operating systems including iOS by Apple, Windows by Microsoft, BlackBerry by RIM, Bada by SamSung and the like.

Accordingly, embodiments of the present invention provide various effects and/or features.

First of all, the present invention provides a mobile terminal, by which a desired application program can be easily activated through a capture image.

Secondly, the present invention provides a mobile terminal, by which an active screen having a configuration equivalent to that of a former active screen of an application program on capturing a capture image can be displayed through the capture image.

It will be apparent to those skilled in the art that various modifications and variations can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen;
a memory; and
a controller configured to:
    activate a first application and cause the touchscreen to display an active screen of the activated first application;
    cause the touchscreen to display a first handwriting input in a first handwriting mode and a second handwriting input in a second handwriting mode on the active screen;
    set a portion of the active screen as an extract region for extracting link information therefrom, wherein the portion of the active screen is set based on the second handwriting input in the second handwriting mode;
    cause the memory to store the active screen as a captured image in response to a capture command received while the active screen, including the first handwriting and the second handwriting, is displayed, wherein the captured image comprises the active careen including the first handwriting, but not including the second handwriting, and wherein the captured image is stored together with setting information and activation information associated with and extracted from the active screen, the setting information including contents of the active screen;
    cause the touchscreen to display the captured image retrieved from the memory; and
    control an operation of the mobile terminal differently based on whether a touch input is received inside or outside of an activation region corresponding to the extract region in the captured image such that:
        the same first application is activated when the touch input is received at the outside of the activation region in the captured image such that the same active screen of the first application that was displayed previously prior to receiving the capture command is re-displayed without the first handwriting by applying the stored setting information to the re-activated first application; and
        a second application that is different from the first application is activated based on the link information when the touch input is received at the inside of the activation region in the captured image.

2. The mobile terminal according to claim 1, wherein the link information comprises information linked to an application program, a uniform resource locator (URL) address linked to a web browser application, an email address linked to an email application, or a phone number linked to a phone application.

3. The mobile terminal according to claim 1, wherein the setting information comprises an alarm time, a phone number inputted through a dial application, file information, or login information that is automatically applied to the first application when the first application is activated in response to the touch input received at the outside of the activation region in the captured image.

4. The mobile terminal according to claim 1, wherein the first handwriting is input as a memo.

5. The mobile terminal according to claim 1, wherein the second handwriting comprised a closed curve.

6. The mobile terminal according to claim 5, wherein a button is displayed on the active screen and the button is included in the closed curve.

7. The mobile terminal according to claim 6, wherein the link information is assigned to the button such that selection of the button displayed on the active screen activates the second application.

8. The mobile terminal according to claim 7, wherein selection of the button included in the activation region in the captured image activates the second application.

9. The mobile terminal according to claim 6, wherein the controller is further configured to cause the touchscreen to display the activation region in the captured image visually identifiably to guide selection of the activation region by a user.

10. The mobile terminal according to claim 1, wherein the first handwriting mode corresponds to a first icon and the second handwriting mode corresponds to a second icon.

11. The mobile terminal according to claim 10, wherein:
the mobile terminal is in the first handwriting mode in response to selection of the first icon from the touchscreen; and
the mobile terminal is in the second handwriting mode in response to selection of the second icon from the touchscreen.

12. The mobile terminal according to claim 1, wherein:
the first handwriting and the second handwriting are input by a stylus pen comprising a button for switching between the first handwriting mode and the second handwriting mode;
the mobile terminal is in the first handwriting mode when the button is set to the first handwriting mode; and
the mobile terminal is in the second handwriting mode when the button is set to the second handwriting mode.

13. The mobile terminal according to claim 1, wherein in response to the capture command, the controller is further configured to:
capture a handwriting input in the first handwriting mode; and
not capture a handwriting input in the second handwriting mode.

14. A method for controlling a mobile terminal, the method comprising:
activating a first application and outputting an activation screen of the first application via a touchscreen;
displaying a first handwriting input in a first handwriting mode and a second handwriting input in a second handwriting mode on the active screen;
setting a portion of the active screen as an extract region for extracting link information therefrom, wherein the portion of the active screen is set based on the second handwriting input in the second handwriting mode;
storing the active screen as a captured image in a memory in response to a capture command received while the active screen, including the first handwriting and the second handwriting, is displayed, wherein the captured image comprises the active careen including the first handwriting, but not including the second handwriting, and wherein the captured image is stored together with setting information and activation information associated with and extracted from the active screen, the setting information including contents of the active screen;
displaying the captured image retrieved from the memory; and
controlling an operation of the mobile terminal differently based on whether a touch input is received inside or outside of an activation region corresponding to the extract region in the captured image such that:
the same first application is activated when the touch input is received at the outside of the activation region in the captured image such that the same active screen of the first application that was previously displayed prior to receiving the capture command is re-displayed without the first handwriting by applying the stored setting information to the re-activated first application; and
a second application that is different from the first application is activated based on the link information when the touch input is received at the inside of the activation region in the captured image.

* * * * *